United States Patent
Colenbrander et al.

(10) Patent No.: US 11,736,741 B2
(45) Date of Patent: *Aug. 22, 2023

(54) ULTRA HIGH-SPEED LOW-LATENCY NETWORK STORAGE

(71) Applicant: Sony Interactive Entertainment LLC., San Mateo, CA (US)

(72) Inventors: Roelof Colenbrander, San Mateo, CA (US); Cliff Pajaro, San Mateo, CA (US); Kim-Huei Low, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/242,203

(22) Filed: Apr. 27, 2021

(65) Prior Publication Data

US 2021/0281890 A1 Sep. 9, 2021

Related U.S. Application Data

(63) Continuation of application No. 15/832,497, filed on Dec. 5, 2017, now Pat. No. 10,992,967.

(51) Int. Cl.
*H04N 21/231* (2011.01)
*G06F 3/06* (2006.01)
(Continued)

(52) U.S. Cl.
CPC ....... *H04N 21/23103* (2013.01); *G06F 3/061* (2013.01); *G06F 3/0614* (2013.01);
(Continued)

(58) Field of Classification Search
CPC .......... H04N 21/23103; H04N 21/2405; G06F 3/061; G06F 3/0614; G06F 11/201; H04L 49/00; H04L 67/1097; H04L 41/0654
See application file for complete search history.

(56) References Cited

U.S. PATENT DOCUMENTS 8,301,832 B1 10/2012 Moore et al.
9,015,350 B2 4/2015 Pettey
(Continued)

FOREIGN PATENT DOCUMENTS

CN 108683618 A 10/2018

OTHER PUBLICATIONS

"Daughterboard", Techopedia, https://www.techopedia.com/definition/6772/daughterboard. Jul. 23, 2013.
(Continued)

*Primary Examiner* — Charles Rones
*Assistant Examiner* — Hewy H Li
(74) *Attorney, Agent, or Firm* — John L. Rogitz; John M. Rogitz (57) ABSTRACT

Non-volatile memory over fabric (NVMe-oF) is used to stream video, computer games, and the like to client devices from network storage embodied by solid state storage devices (SSDs). To provide for redundancy, multiple copies of a single piece of content, e.g., a computer game or video file, are stored on multiple SSDs. To provide information to address the block-level storage based on a client demand for the content, a data structure correlates each content with the SSDs and related block numbers at which the content is stored. Sourcing of the content as it is being streamed may be dynamically switched between SSDs to provide for load balancing or loss of a SSD.

13 Claims, 7 Drawing Sheets

Server Stack (51) Int. Cl.
*H04N 21/24* (2011.01)
*G06F 11/20* (2006.01)
*H04L 67/1097* (2022.01)
*H04L 49/00* (2022.01)
*H04L 41/0654* (2022.01)

(52) U.S. Cl.
CPC ............ *G06F 11/201* (2013.01); *H04L 49/00* (2013.01); *H04L 67/1097* (2013.01); *H04N 21/2405* (2013.01); *H04L 41/0654* (2013.01)

(56) References Cited

U.S. PATENT DOCUMENTS

| | | | |
|---|---|---|---|
| 10,645,164 B1* | 5/2020 | Malwankar | G06F 3/0653 |
| 2004/0225719 A1 | 11/2004 | Kisley et al. | |
| 2006/0280195 A1 | 12/2006 | Lopez et al. | |
| 2008/0301254 A1 | 12/2008 | Bestler | |
| 2009/0240705 A1 | 9/2009 | Miloushev et al. | |
| 2014/0040526 A1 | 2/2014 | Chang et al. | |
| 2015/0201036 A1 | 7/2015 | Nishiki et al. | |
| 2015/0215343 A1 | 7/2015 | Itkin et al. | |
| 2015/0254088 A1 | 9/2015 | Chou et al. | |
| 2015/0281029 A1* | 10/2015 | Callahan | A63F 13/355 709/224 |
| 2016/0139820 A1* | 5/2016 | Fluman | G06F 3/061 711/114 |
| 2016/0306574 A1* | 10/2016 | Friedman | G06F 12/0802 |
| 2016/0370997 A1 | 12/2016 | Maroney | |
| 2017/0150621 A1 | 5/2017 | Breakstone et al. | |
| 2017/0177222 A1 | 6/2017 | Singh et al. | |
| 2017/0286363 A1 | 10/2017 | Joshua et al. | |
| 2018/0004703 A1* | 1/2018 | Sharma | G06F 13/4072 |
| 2018/0341619 A1 | 11/2018 | Slik | |
| 2019/0101880 A1* | 4/2019 | Guim Bernat | G06F 12/0238 |

OTHER PUBLICATIONS

"Lustre: A Scalable, High-Performance File System". Cluster File Systems, Inc. . Nov. 11, 2002. (Year: 2002).

"Northbridge + Southbridge = Unitedbridge? Is the division olikely to persist?" superuser . . . Aug. 2011. (Year: 2011).

"NVM Express Moves Into the Future", accessed for disclosure from http://www.nvmexpress.org/wp-content/uploads/NVMe_Over_Fabrics.pdf on Nov. 9, 2017.

"PC Motherboard Technology". Extremetech . . . Jun. 2001. (Year: 2001).

"What is the difference between Northbridge and Southbridge in computer hardware?". Quora . . . Oct. 2017 (Year: 2017).

IEEE Standard Glossary of Computer Hardware Terminnology. Jun. 14, 1994. (Year: 1994).

Stokes, Jon. "PCI Express: An Overview". Jul. 7, 2004 . . . (Year: 2004).

Yurizaki, Mira. "[GUIDE] PCIe Lane Distribution (Updated Nov. 21, 2018)" . . . (Year: 2016).

* cited by examiner

FIG. 3   Server Stack

FIG. 4   Server Architecture (A)

FIG. 4A

FIG. 5 Server Architecture (B) (shared daughter board)

FIG. 6 Server Architecture (C)

FIG. 7  NVMe RDMA card ("daughter board")

FIG. 8  Flowchart - storage

FIG. 9     Data structure

FIG. 10     Gameplay logic

ULTRA HIGH-SPEED LOW-LATENCY NETWORK STORAGE

FIELD

The application relates generally to high speed, low latency network storage and in particular to such systems for use in networked computer gaming, video broadcasting, content delivery networks, virtual machines, and machine learning applications.

BACKGROUND

Data storage devices known as solid state drives (SSD) have been introduced as replacements for the venerable hard disk drives (HDD). SSD technology uses solid state storage rather than disk-based storage and currently has a much faster data transfer rate than HDD technology, albeit at a (currently) higher cost per byte of storage.

A communication standard has emerged that is related to SSDs, namely, Nonvolatile Memory Express (NVMe) in which SSDs do not communicate using serial AT attachment (SATA) protocol but rather use a faster NVMe protocol. A communication protocol related to NVMe is over Fabrics (NVMe-oF), which is a technology specification designed to enable NVMe message-based commands to transfer data between a host computer and a target solid-state storage device or system (essentially, a SSD storage system) over a "fabric", which is a colloquialism that means a network such as Ethernet, Fibre Channel, and InfiniBand. NVMe-oF uses a message-based model to communicate between a host and target storage device over the peripheral component interconnect express (PCI(e)) protocol, which contributes to the speed of data transfer because it is a faster transfer mechanism than the older SATA protocol.

SUMMARY

As understood herein, the NVMe-oF protocol is somewhat minimalist, leaving to designers to resolve some issues and particularly issues that may be application-specific. Among these unaddressed issues are data redundancy, the need for a host to locate data on a block basis in a NVMe-enabled SSD in the absence of a file system, and load balancing.

Accordingly, a computer-implemented server stack includes at least one management server having access to a mapping data structure, plural compute servers each including plural computer motherboards, and at least one storage server including at least first and second non-volatile memory (NVMe)-enabled solid state drives (SSDs). In this first aspect a compute server includes at least a first computer motherboard having at least one processing unit and at least a second computer motherboard having at least one processing unit. The compute server further includes at least one NVMe over fabric (NVMe-oF) communication path connecting the motherboards to the NVMe-enabled SSDs of the storage server. The server stack is programmed with instructions to receive a request for a piece of content from a client computer. Also, the instructions configure the server stack to access the mapping data structure using an identification of the piece of content to identify that the piece of content is stored on at least the first NVMe-enabled SSD and to identify what blocks of the first NVMe-enabled SSD store the piece of content. The server stack is further programmed with instructions to, based on identifying the first NVMe-enabled SSD and the blocks of the first NVMe-enabled SSD that store the piece of content, cause the piece of content to be streamed to the client device directly over the NVMe-oF path without passing through a compute server.

In embodiments, the SSDs do not contain spinning disks.

The data structure can further correlate the piece of content as being stored on the second NVMe-enabled SSD along with the blocks of the second NVMe-enabled SSD store the piece of content. In this case, the server stack may be programmed with instructions to, responsive to a determination that the first NVMe-enabled SSD has failed, switch to the second NVMe-enabled SSD to provide the piece of content to the client computer to thereby provide data redundancy. A client can report drive failures to some other system, e.g., to the management server, so the drive may be taken out of block mapping if other systems report failures too. This may result in some other system adding downloading of an extra copy of the contents to another drive. In addition, it alerts the operational team to replace the failed drive.

Also, the server stack may be programmed with instructions to, responsive to a determination that a load balancing condition is met with the first NVMe-enabled SSD remaining operational, switch to the second NVMe-enabled SSD to provide the piece of content to the client computer to thereby provide load balancing.

If desired, the piece of content can be striped across the NVMe-enabled SSDs. In addition, or alternatively, a piece of content can be entirely recorded on each of the NVMe-enabled SSDs.

The piece of content may be, for example, a video such as a complete movie or a complete TV show, or it may be a computer game.

In some embodiments, the management server is not the storage server or any of the compute servers. In other embodiments, the management server is implemented by at least one of the compute servers. In other embodiments, the management server is implemented by the storage server.

In another aspect, a device includes at least one computer memory that is not a transitory signal and that in turn includes instructions executable by at least one processor to identify plural complete copies of a piece of content on at least first and second non-volatile memory (NVMe)-enabled solid state drives (SSDs). A data structure correlates an identification of the piece of content to identifications of the first and second SSDs and associated blocks of each SSD at which the piece of content is stored. The instructions are further executable to, responsive to a request from a client computer for the piece of content, access the data structure to determine where on the first and second SSDs the piece of content is stored. The instructions are executable to, responsive to determining where on the first and second SSDs the piece of content is stored, access and send the piece of content from at least the first SSD to the client computer using at least one NVMe over fabric (NVMe-oF) communication path using peripheral component interconnect express (PCI(e)) protocol.

In another aspect, a method includes providing a non-volatile memory over fabric (NVMe-oF) networked storage system. The method also includes proving data redundancy in the NVMe-oF networked storage system, and providing load balancing in the NVMe-oF networked storage system.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to distributed computer game networks, video broadcasting, content delivery networks, virtual machines, and machine learning applications. A system herein may include server and client components, connected over a network such that data may be exchanged between the client and server components. The client components may include one or more computing devices including game consoles such as Sony PlayStation® and related motherboards, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access web sites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console and/or one or more motherboards thereof such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g., computerized Internet enabled refrigerator, washer, or dryer. The AVD 12 alternatively may also be a computerized Internet enabled ("smart") telephone, a tablet computer, a notebook computer, a wearable computerized device such as e.g., computerized Internet-enabled watch, a computerized Internet-enabled bracelet, other computerized Internet-enabled devices, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Figure 1:
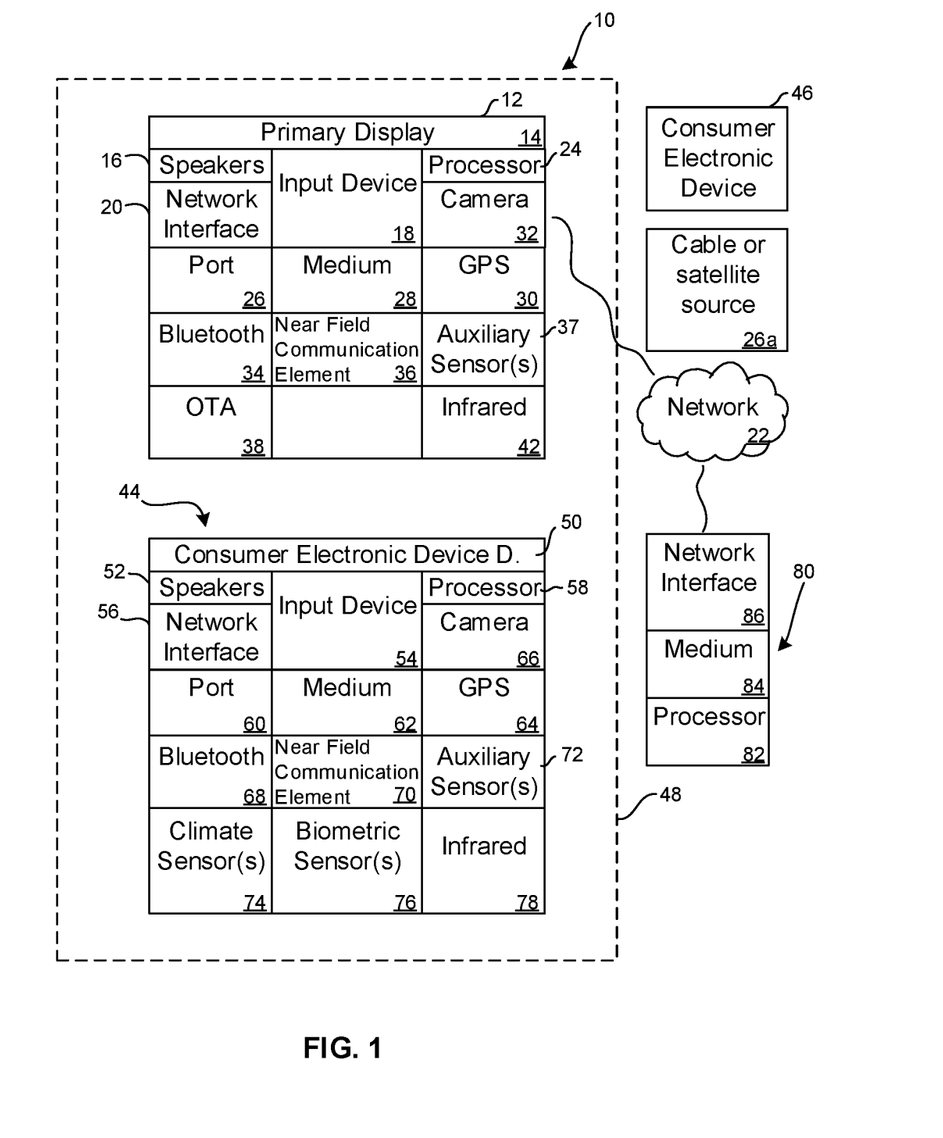
FIG. 1 is a block diagram of an example system including an example in accordance with present principles.

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g., an audio receiver/microphone for e.g., entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g., controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high-definition multimedia interface (HDMI) port or a USB port to physically connect (e.g., using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g., receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to e.g., determine the location of the AVD 12 in e.g., all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the processor 24. The AVD 12 may include an over-the-air TV broadcast port 38 for receiving OTH TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used. As alluded to above, the CE device 44/46 and/or the source 26a may be implemented by a game console. Or, one or more of the CE devices 44/46 may be implemented by devices sold under the trademarks Google Chromecast, Roku, Amazon FireTV.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVD 12, or it may be a more sophisticated device such as a tablet computer, a game controller communicating via wired or wireless link with a game console implemented by the second CE device 46 and controlling video game presentation on the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g., an audio receiver/microphone for e.g., entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g., controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g., using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g., determine the location of the first CE device 44 in e.g., all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the CE device processor 58. The first CE device 44 may include still other sensors such as e.g., one or more climate sensors 74 (e.g., barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage. In an implementation, the medium 84 includes one or more SSDs. The server also includes at least one network interface 86 that allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver. The network interface 86 may be a remote direct memory access (RDMA) interface that directly connects the medium 84 to a network such as a so-called "fabric" without passing through the server processor 82. The network may include an Ethernet network and/or Fibre Channel network and/or InfiniBand network. Typically, the server 80 includes multiple processors in multiple computers referred to as "blades" that may be arranged in a physical server "stack".

Accordingly, in some embodiments the server 80 may be an Internet server or an entire "server farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
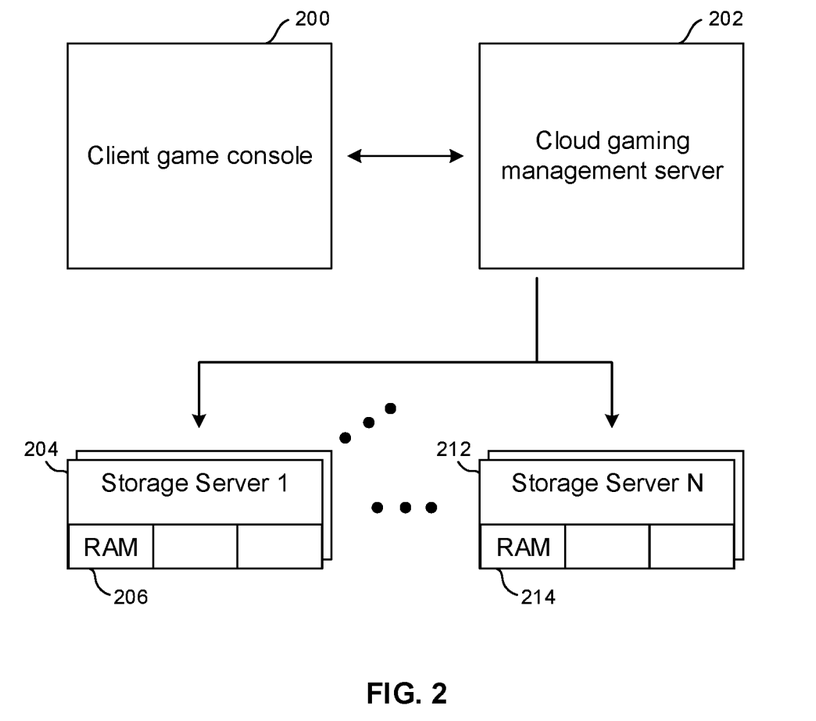
FIG. 2 is a schematic diagram of a cloud-based gaming system.

FIG. 2 illustrates an example application in the form of a cloud computer game environment in which one or more client game consoles 200 (also referred to as "game systems", "game devices") such as Sony PlayStations®, Microsoft Xboxes®, etc. communicate over a wired and/or wireless link with a cloud-based gaming management server 202, typically an Internet server. In turn, the management server 202 communicates with a first game server 204 (which may be embodied by multiple server "blades") that includes one or more solid state memories 206 such as a random-access memory (RAM) including NVMe-enabled SSDs that use solid state memory such as but not limited to flash or 3D Xpoint. The management server 202 communicates with up to "N" such servers, including an $N^{th}$ game server 212 that includes one or more solid state memories 214.

Figure 3:
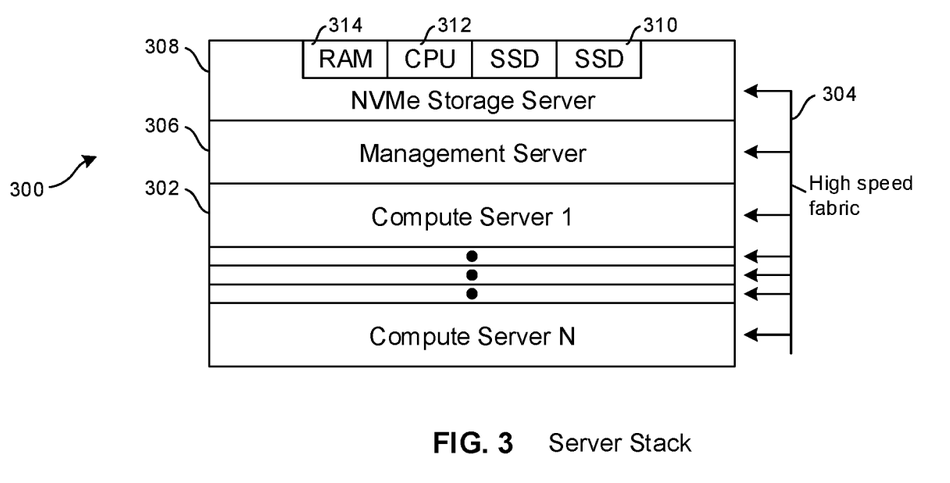
FIG. 3 is a schematic diagram of an example server stack.

FIG. 3 illustrates an example server stack 300 that may be contained in a single stack casing, with a server farm typically comprising many such server stacks. The server stack 300 includes plural compute servers 302 that execute computation for clients connected to the server stack through a high-speed fabric 304. Each server in the stack may be connected to the fabric. A management server 306 may also be included in the stack, and one or more NVMe-enabled storage servers 308 may be included in the stack as shown. Note that by using a fabric solution, compute servers can to communicate with each other in high-speed fashion, which can allow for 'bundling of compute nodes' for heavy compute work.

A storage server 308 can include one or more (typically several) SSDs 310 that are NVMe-enabled and that are directly accessible to the other servers in the stack via the fabric 304. The storage server 308 also typically includes one or more processors 312 and one or more cache-type random access memories (RAM) 314. The SSDs 310 can be accessed, and content streamed therefrom without passing through the CPU 312.

The management server 306 executes management tasks for the stack, some of which are discussed further below, while the storage server executes storage functions for the stack. In embodiments, the management server 306 may be a separate server apart from the compute and storage servers as shown, or it may be implemented by a compute server and/or storage server. The management server 306 may be implemented by one of the below-described daughter boards of a motherboard of a server.

Figure 4:
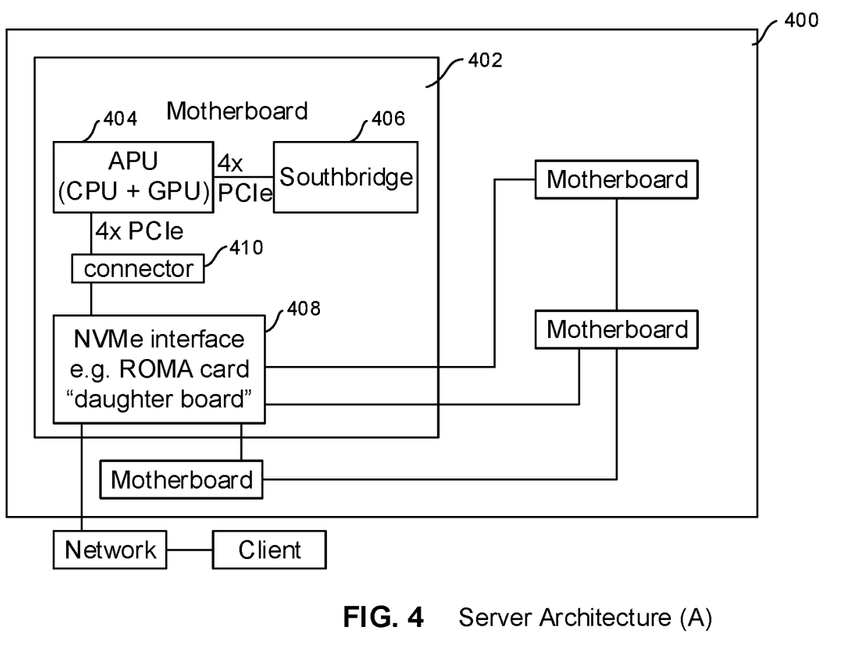
FIG. 4 is a block diagram of a first example architecture for a single server.
Figure 5:
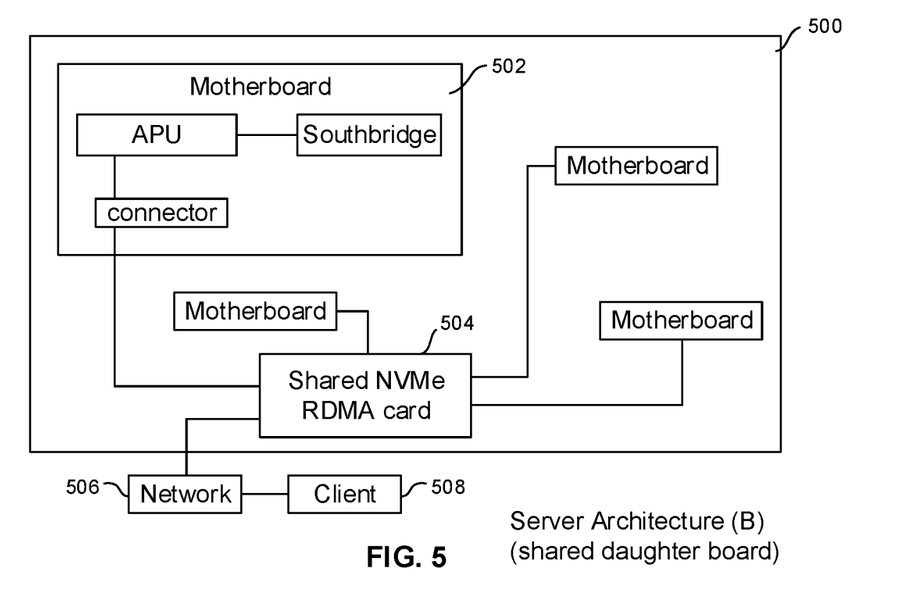
FIG. 5 is a block diagram of a second example architecture for a single server.
Figure 6:
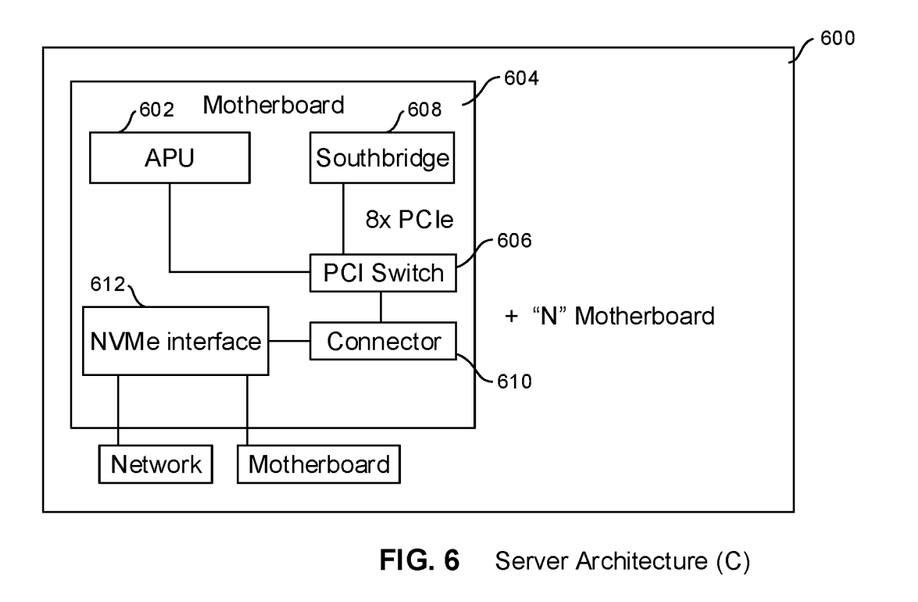
FIG. 6 is a block diagram of a third example architecture for a single server.

FIGS. 4-6 illustrate example architectures of a server in the stack 300, and particularly architectures that may be used to implement a compute server 302. As shown, a server 400 may include plural motherboards 402, with the motherboards 402 being substantially identical to each other and therefore with the details of only a single motherboard illustrated for clarity. In the examples shown, each server 400 includes four motherboards, although greater or fewer may be used. Each motherboard may be, e.g., a motherboard that would otherwise be associated with a computer game console. In some examples, the majority of the motherboards of a server can be identical to each other and one or more motherboards of the server may be different than the others, e.g., three motherboards may be computer game console motherboards and one may be a personal computer motherboard.

In the example shown in FIG. 4, a motherboard 402 includes a processor 404. The processor 404 may be an accelerated processing unit (APU) that is a processing chip on a single die acting as a central processing unit (CPU) and graphics processing unit (GPU). The processor 404 may communicate with a southbridge 406 using PCI(e) and in the non-limiting example shown using four PCI(e) lanes.

Also, the processor 404 may be connected to a fabrics adapter 408 through a connector 410 over, e.g., four PCI(e) lanes. The connector 410 may be a cable connector such as an Oculink or M2 connector.

In an example, the fabrics adapter 408 may be implemented as a "daughter board", i.e., a circuit board that is part of the motherboard 402, and may implement a NVMe interface such as remote direct memory access (RDMA) (including Infiniband, virtual interface architecture, RDMA over converged Ethernet (RoCE), and Internet wide area RDMA protocol (iWARP)). Or, the fabrics adapter 408 may be another type of NVMe interface such as NVMe over fiber channel. In any case, the motherboard 402 is connected through the fabric adapter 408 to the other motherboards 402 of the server 400 as shown, and is also connected, through the fabrics adapter, to the SSDs of the storage server 308 shown in FIG. 3 and also to a network and thence to a remote client.

In a cloud-based gaming application, the motherboards 402 of a server 400 may cooperate to stream a computer game stored on the SSDs 310 of the storage server 308 to a remote client such as a computer game console. Or, in a video streaming application the motherboards 402 of a server 400 may cooperate to stream a movie or TV show stored on the storage server 308 to a remote client such as a video playback device.

In examples, each piece of content, meaning each computer game or each complete video program, be it a movie, TV show, or other video program, is stored on plural SSDs. Each piece of content may be stored in its entirety on each one of plural SSDs. In addition, or alternatively, each piece of content can be striped across plural SSDs. In any case, multiple motherboards 402 (and indeed multiple compute servers) may be used to stream a single piece of content stored on multiple SSDs to a client owing to the speed provided by the NVMe-oF technology. Also, a single piece of content may be streamed by seamlessly switching between SSDs storing that content for data redundancy and load balancing as described further below.

Figure 4A:
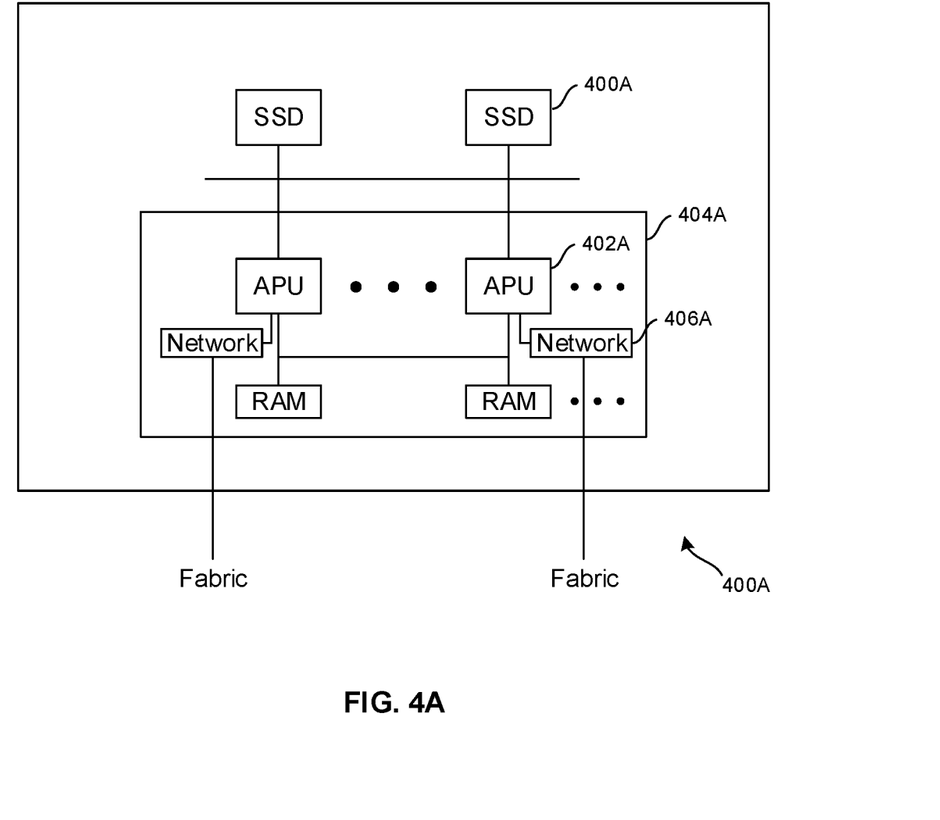
FIG. 4A is a block diagram of an example architecture for a storage server.

Prior to describing additional server architectures, reference is briefly made to FIG. 4A, which shows an architecture particularly adapted for storage servers. A server 400A may have at least one and preferably (for bandwidth reasons) plural processors such as APUs 402A on a typically single motherboard 404A including multiple network adapters 406A to access the fabric. One or more NVMe-enabled SSDs 408A communicate with the processors. The motherboard 404A can include plural "sockets" and each socket can be filled with a processor such as an APU or CPU. As shown each socket can include its own RAM as well, and different CPUs can access each other's RAM.

FIG. 5 shows an alternate architecture for a server 500 that, like the other architectures herein disclosed, may be used by any server herein. The server 500 in FIG. 5 is in all essential respects identical to the server 400 shown in FIG. 4 except that instead of each motherboard 502 having its own respective fabric adapter, the motherboards 502 in FIG. 5 share a single common fabric adapter 504 to communicate with the network fabric 506 and thence to other components including storage servers and remote client devices 508 such as end user game consoles or video players.

FIG. 6 shows an alternate architecture for a server 600 that, like the other architectures herein disclosed, may be used by any server herein. The server 600 in FIG. 6 is in all essential respects identical to the server 400 shown in FIG. 4 except that the APU 602 of each motherboard 604 shown in FIG. 6 is connected to a respective PCI(e) switch 606 and thence to a southbridge 608 via eight PCI(e) lanes. The switch 606 in turn connects the above-mentioned components to a connector 610 such as an Oculink or M2 connector which is connected to a fabric adapter 612. The technique of FIG. 6 provides eight PCI(e) lanes among the connected devices, while providing for load balancing such that higher data throughput is obtained if the other chip is not using much bandwidth. It is to be understood that the architecture in FIG. 6 may employ the shared fabric adapter technique of FIG. 5.

Figure 7:
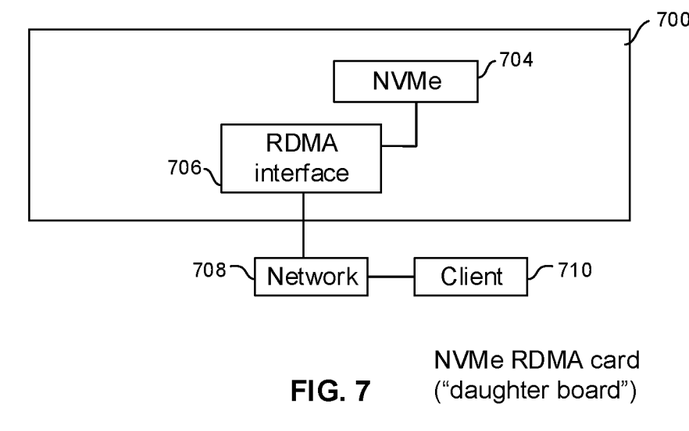
FIG. 7 is a block diagram of an example architecture for a NVMe network card, also referred to herein as a "daughter board"

FIG. 7 shows an example of a fabric adapter disclosed above, implemented as a daughter board 700 using, as a non-limiting example, RDMA. The daughter board 700 may not include at least one APU but in some examples may include an APU. The example daughter board 700 shown in FIG. 7 includes at least one NVMe-enabled storage 704 such as an SSD connected to a fabric interface 706 such as an RDMA interface and thence to a network fabric 708, which in turn may be connected to other servers in the stack and to remote end user client devices 710.

Figure 8:
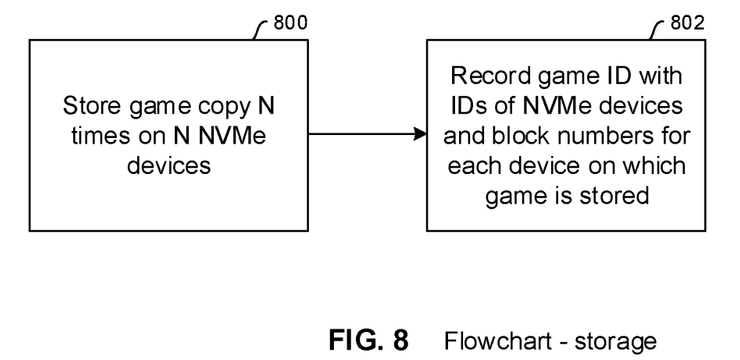
FIG. 8 is a flow chart of example storage logic.

FIG. 8 illustrates example storage logic. Commencing at block 800, each piece of content such as a complete computer game or a complete video program is stored "N" times on "N" NVMe storage devices, with "N" being an integer greater than one. At block 802, a mapping data structure is established in which the ID of each piece of content is correlated with the IDs of the storage devices storing it and the block numbers on each storage device that store the content.

Figure 9:
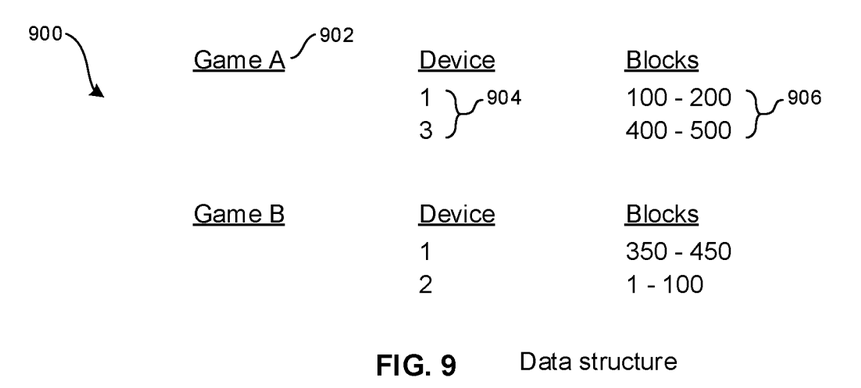
FIG. 9 is a schematic diagram of an example data structure correlating content such as computer games, video files, and the like to respective storage devices and the blocks on those storage devices at which the content is stored.

FIG. 9 shows a resultant mapping data structure 900 that correlates content pieces 902 such as computer games, video programs, and the like to identifiers 904 of SSDs storing that content and the identifications 906 of the blocks of each SSD identified by the device IDs 904 that store the content indicated at 902. Thus, in the example shown, each piece of content is stored on plural devices. Game A, for example, is stored on SSDs 1 and 3, and it is stored at blocks 100-200 on SSD 1 and on blocks 400-500 on SSD 3. Game B in the example shown is stored on SSDs 1 and 2, and it is stored at blocks 350-450 on SSD 1 and on blocks 1-100 on SSD 2. While the block numbers in FIG. 9 are contiguous, it is to be understood that they need not be continuous, with multiple groups of block numbers storing a particular piece of content on an SSD being listed in the mapping data structure. Defragmentation can be executed to minimize non-contiguities in the blocks.

Figure 10:
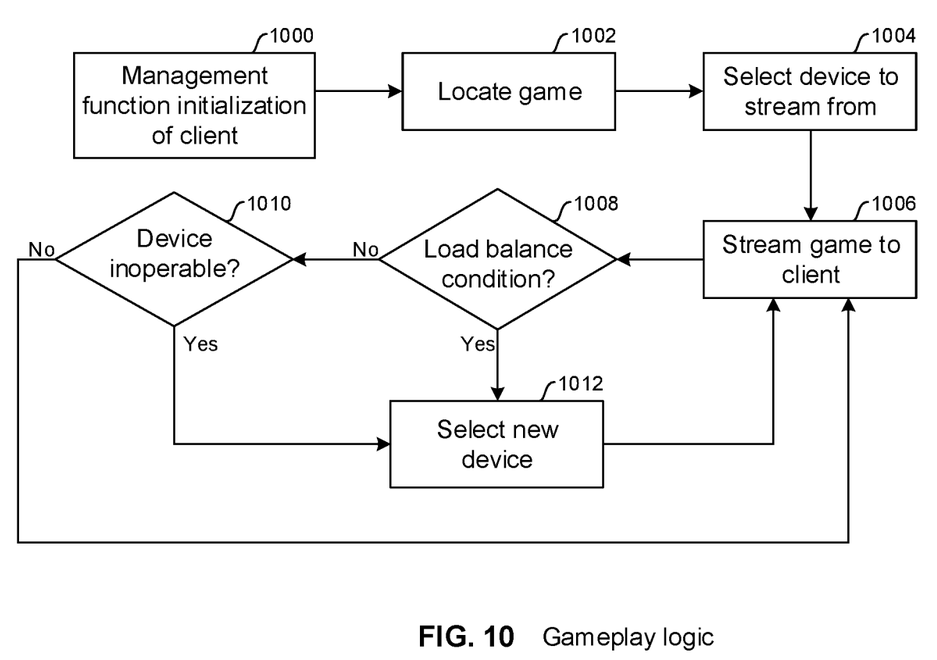
FIG. 10 is a flow chart of example streaming logic in the context of a computer game application.

FIG. 10 illustrates example content streaming logic using any of the server architectures shown above. The logic may be distributed among the processors of a server stack or may be implemented by a selected one of the processors in the stack. Incidentally, the particular file system or encryption used can be defined by the particular application, and the compute servers can execute decryption if the content is encrypted. In the case of encrypted content, encryption keys can be provided along the 'block mapping' back to the compute server. In an example, the management server and the computer server(s) can execute a handshake to retrieve the block mapping and encryption keys. Authentication of compute servers may be implemented as well as a condition precedent for the management server to return block mapping and encryption keys back to compute server(s). A compute server, to this end, may share credentials for a user or a token.

Commencing at block 1000, when an end user device establishes communication with a cloud source of content associated with the server stack, the management server in the stack typically executes certain initialization functions, such as verifying digital rights management (DRM) aspects of a request for content, assigning one or more compute servers to the client request, and then accessing the mapping data structure to ascertain where the content is stored at block 1002. Thus, at block 1002, by means of the mapping data structure such as the example shown in FIG. 9, the SSDs on which the requested content is stored and the block numbers of those SSDs that store the requested content are identified and provided to the compute server(s) assigned to the request for executing the request. The compute servers then use the information concerning where the content is stored to access the content and stream it to the requesting client. If desired, the storage location information from the mapping data structure may be provided to the requesting client to permit direct access to the content by the requesting client.

With greater specificity, at block 1004 an assigned compute server selects which of the plural SSDs identified by the management server as storing the requested content to stream the content from. This may be done by initially pseudo-randomly selecting one of the SSDs that store the content, or it may be done using any of the example non-limiting load balancing techniques described below. The content is then streamed to the client at block 1006. Note that after the initial pseudo-random selection process, the selected device that is known to be good can be cached, and used as default in the future. In addition, while idling, the compute servers can periodically (say every 30 minutes) ping the default device to detect that it is still operable or otherwise select a good device ahead of time. This can facilitate hot swapping failed devices with new devices, since the compute servers automatically detect inoperable devices and switch to other good devices.

Decision diamond 1008 indicates that an assigned compute server may determine whether a load balancing condition exists on which to seamlessly switch streamlining the content from a first SSD to a second SSD. As an example, if network congestion or latency between the currently streaming SSD and the client satisfies a threshold, a load balancing condition may be deemed to exist. Such congestion or latency determinations may be determined in non-limiting examples by determining whether a number of requests for retransmissions of packets from the client exceeds a threshold, whether a direct report of excessive latency from the client has been received, or it may be based on whether measured round-trip times of test tones transmitted from the server stack to the client and back exceed a threshold period. Yet again, a load balancing condition may be deemed to exist if the number of input/output requests to a particular SSD exceeds a threshold. These are but illustrative non-limiting example techniques for determining whether a load balancing condition exists.

Also, decision diamond 1010 indicates that a determination may be made whether the currently streamlining SSD has become inoperable, as indicated by, e.g., observing that little or no data is being transmitted from the SSD through the associated NVMe-oF interface of the SSD. If the currently streamlining device is inoperable, or if a load balancing condition exists at decision diamond 1008, the logic moves to block 1012 to switch streamlining the content to another drive storing the content as indicated by the mapping data structure. In so doing, it may be noted how many blocks of the content from the first SSD had been streamed to the client and then accessing the second SSD at the corresponding "next" block at which the content is stored on the second SSD. For example, using the example mapping data structure of FIG. 9, if SSD #1 streamed content up to block 50 on SSD 1 to the client device and then either a load balancing condition arose or the SSD #1 failed, content would be dynamically switched to be streamed from SSD #3 starting at block 450 of SSD #3.

In this way, responsive to a determination that a currently used NVMe-enabled SSD has failed, streaming can be switched to a second NVMe-enabled SSD to provide the piece of content to the client computer, to provide data redundancy. Recall from earlier description that a server such as but not limited to the management server can be notified of the inoperability of a SSD, so that another copy of the data can be placed on the storage server (and in the block mapping). Technical personnel also may be notified to replace the failed SSD.

Or, responsive to a determination that a load balancing condition is met with the first NVMe-enabled SSD remaining operational, streaming nonetheless can be switched to the second NVMe-enabled SSD to provide the piece of content to the client computer.

Note that for transfers that are very latency-sensitive, and if congestions are likely, load-balancing/redundancy may be enhanced using the architectures herein as follows. Assume a compute server seeks to access content blocks 1-100 stored on each of two NVMe-enabled SSDs. The first "N" blocks (e.g., ten, in this example, blocks 1-10) can be fetched from a first NVMe-enabled SSD and the next several blocks of the content (in this example, blocks 11-20) can be fetched from a second NVMe-enabled SSD. The rest of the content blocks (in this example, 21-100) may then be fetched exclusively from the SSD that returned its initial blocks to the requesting compute server the fastest. By extension, if one of the NVMe-enabled SSDs does not return any requested blocks initially, the missing blocks as well as the remaining blocks are fetched from the SSD that returned the initially requested blocks. This eliminates one round trip latency in case one of the initial SSDs sought to be accessed is malfunctioning.

Content such as a single piece of content may be stored on plural storage servers of respective plural server stacks, in which case the mapping data structure above can correlate a server ID with each piece of content. Also, a compute server may communicate with a "virtual drive" implemented by a processor in a storage server for flexibility instead of communicating directly with a physical SSD, from whence the "virtual drive" obtains data. If SSD storage is insufficient to store all content sought to be sourced to clients, the most popular (most requested) pieces of content may be stored on the SSDs of a storage server and client calls for less popular content intercepted, e.g., by a processor of a compute server or the management server or a storage server and sent to a master storage facility storing the less popular content for sourcing the less popular content from the master storage facility.

It will be appreciated that whilst present principals have been described with reference to some example embodiments, these are not intended to be limiting, and that various alternative arrangements may be used to implement the subject matter claimed herein.

What is claimed is:

1. A computer-implemented server stack comprising:
   at least one storage server, the storage server comprising at least first and second non-volatile memory (NVMe)-enabled solid state drives (SSD);
   at least first and second compute servers, at least the first compute server comprising:
   at least a first computer motherboard comprising at least one processing unit;
   at least a second computer motherboard comprising at least one processing unit; and
   at least one NVMe over fabric (NVMe-oF) communication path connecting the motherboards to the first and second NVMe-enabled SSDs, the NVMe-oF communication path comprising a single common fabric adapter that implements a NVMe interface such that the first compute server has one and only one fabric adapter;
   wherein the server stack is programmed with instructions to:

receive a request for a piece of content from a client computer;
   cause the piece of content to be streamed to the client device over the NVMe-oF path.

2. The computer-implemented server stack of claim 1, wherein a data structure further correlates the piece of content as being stored on at least the second NVMe-enabled SSD along with the blocks of the second NVMe-enabled SSD store the piece of content, and the server stack is programmed with instructions to:
   responsive to a determination that the first NVMe-enabled SSD has failed, switch to the second NVMe-enabled SSD to provide the piece of content to the client computer.

3. The computer-implemented server stack of claim 1, wherein a data structure further correlates the piece of content as being stored on at least the second NVMe-enabled SSD along with what blocks of the second NVMe-enabled SSD store the piece of content, and the server stack is programmed with instructions to:
   responsive to a determination that a load balancing condition is met with the first NVMe-enabled SSD remaining operational, switch to the second NVMe-enabled SSD to provide the piece of content to the client computer.

4. The computer-implemented server stack of claim 1, wherein the piece of content is striped across the first and second NVMe-enabled SSDs.

5. The computer-implemented server stack of claim 1, wherein the piece of content is entirely recorded on each of the first and second NVMe-enabled SSDs.

6. The computer-implemented server stack of claim 1, wherein the piece of content is a video.

7. The computer-implemented server stack of claim 1, wherein the piece of content is a computer game.

8. The computer-implemented server stack of claim 1, comprising a management server that is not the storage server or any of the compute servers.

9. The computer-implemented server stack of claim 1, comprising a management server that is implemented by at least one of the compute servers.

10. The computer-implemented server stack of claim 1, comprising a management server that is implemented by the storage server.

11. Device comprising:
    at least a first compute server comprising:
    at least a first computer motherboard comprising at least one processing unit;
    at least a second computer motherboard comprising at least one processing unit;
    at least one communication path comprising at least one fabric adapter, each processing unit being connected to a respective switch through which the respective processing unit is coupled to a respective southbridge via plural lanes, each respective switch also connecting the respective processing unit to the respective fabric adapter.

12. A system comprising:
    at least one server comprising plural motherboards comprising respective processors communicatively coupled to respective southbridges using peripheral component interconnect express (PCI(e)) protocol;
    the respective processors also communicatively coupled to respective fabrics adapters through respective connectors, at least one of the fabrics adapters implementing a non-volatile memory (NVMe) interface, each respective motherboard being connected through the respective fabrics adapter to the other motherboards of the server and also being connected, through the respective the fabrics adapter, to at least one storage server of the networked storage system.

13. The system of claim 12, wherein pieces of content are correlated to solid state drives (SSDs) in the networked storage system and to blocks in each SSD at which each respective piece of content is stored, wherein the motherboards of the server are programmed to cooperate to stream a computer simulation stored on the SSDs to a remote client, or the motherboards of the server are programmed to cooperate to stream a movie or TV show stored on the SSDs to a remote client.

* * * * *